June 24, 1930.  D. C. KLAUSMEYER ET AL  1,765,592
SINGLE LEVER EIGHT-SPEED SHIFT MECHANISM
Filed Sept. 29, 1924  2 Sheets-Sheet 2
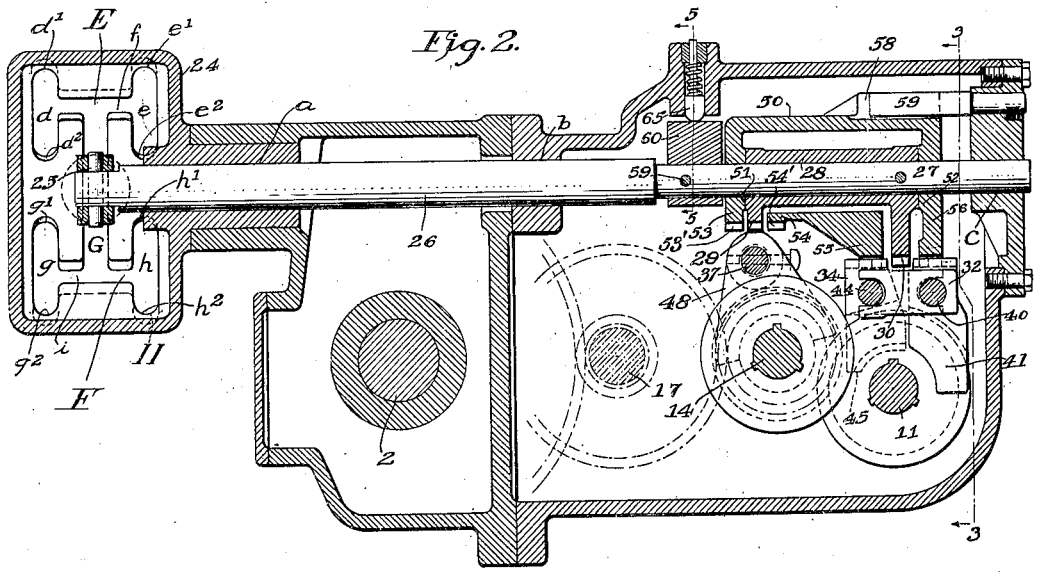
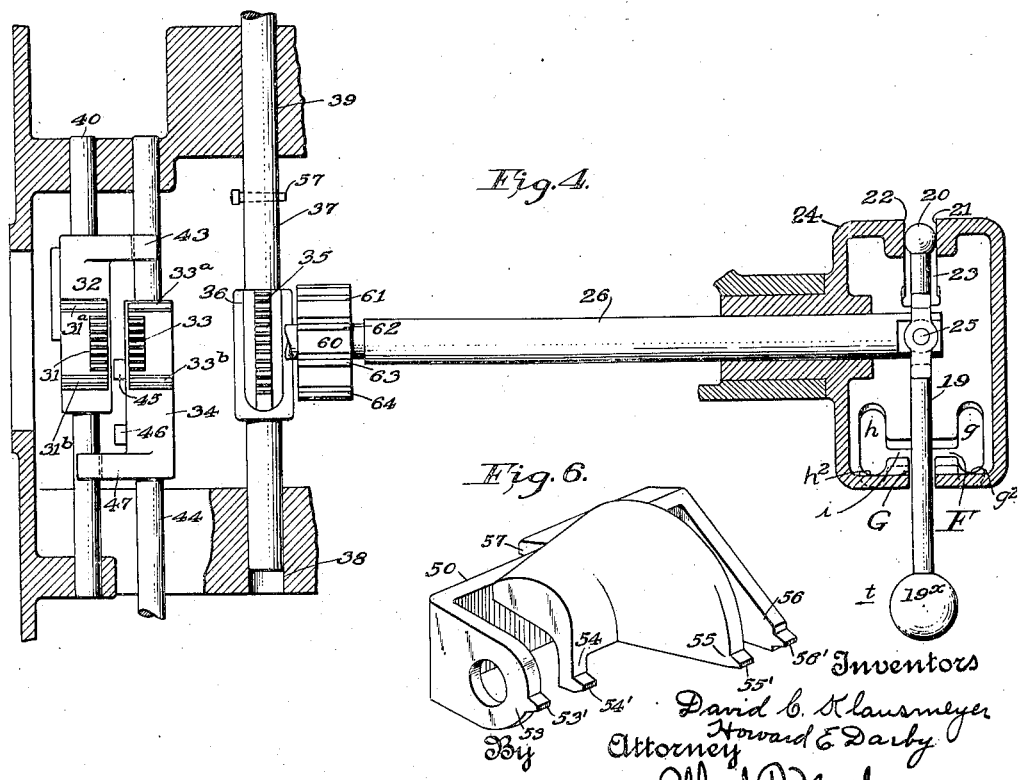

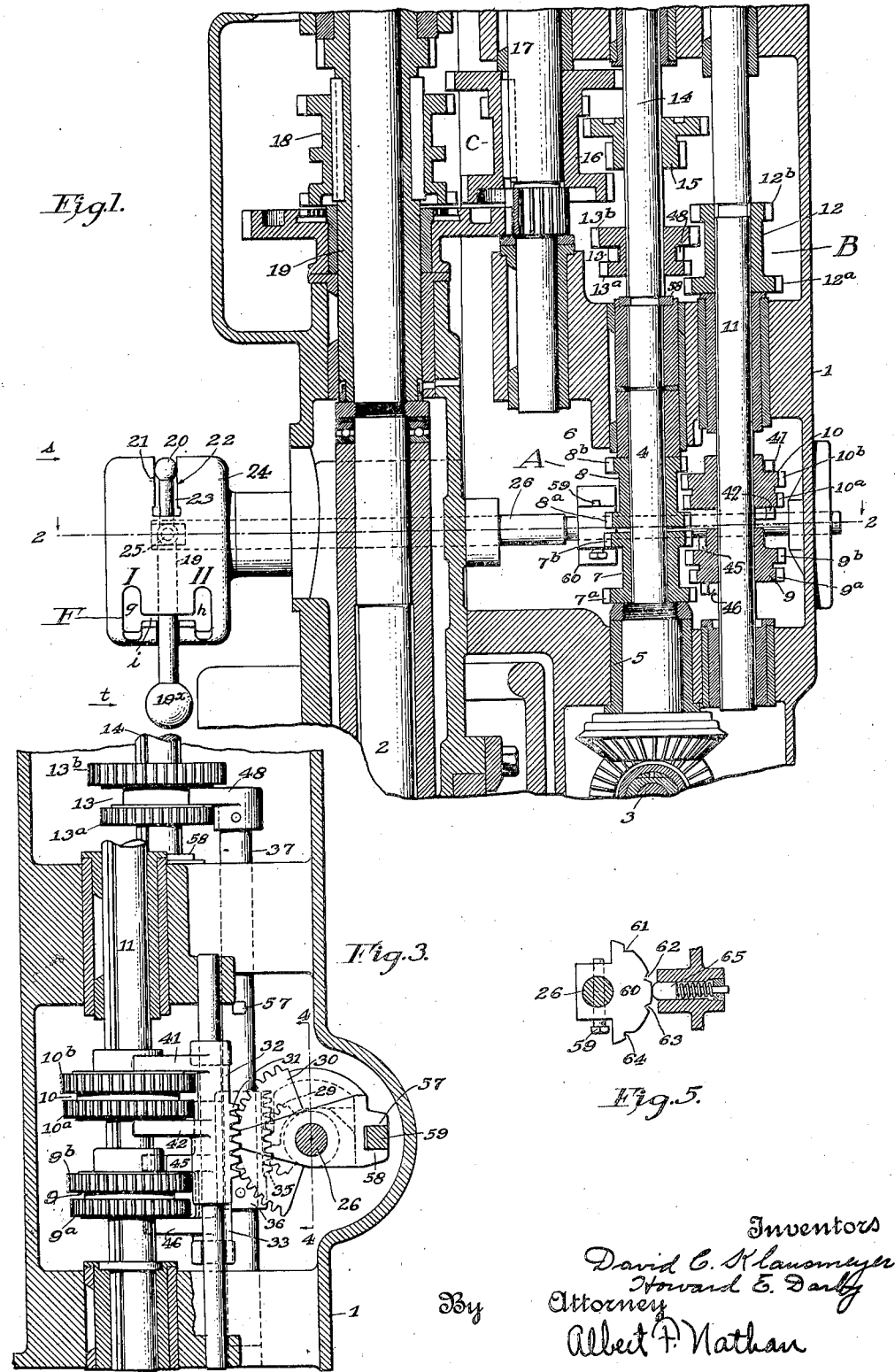

Patented June 24, 1930

1,765,592

UNITED STATES PATENT OFFICE

DAVID C. KLAUSMEYER, OF CINCINNATI, AND HOWARD E. DARBY, OF NORWOOD, OHIO, ASSIGNORS TO THE CINCINNATI BICKFORD TOOL COMPANY, OF CINCINNATI, OHIO, A CORPORATION OF OHIO

SINGLE-LEVER EIGHT-SPEED SHIFT MECHANISM

Application filed September 29, 1924. Serial No. 740,498.

This invention relates to controlling devices for speed-change mechanisms such as are used, for example, in machine-tools wherein it is desirable that the speed of rotation of certain operating shafts be made variable.

A radial drill furnishes a good example of such a machine and this invention will therefore be disclosed in connection with a portion of such a machine-tool as representing one of the practical embodiments of the invention. It is to be understood, however, that the invention is neither limited to radial drills specifically nor to machine-tools generally but that it is likewise adaptable to any form of mechanism wherein it is desired selectively to rotate a driven shaft at any one of a plurality of speeds by means of change-gear mechanisms.

In a radial-drill it is desirable that the drill-spindle and the drill carried thereby be rotated at various speeds the rate of which is dependent upon the size of the drill being used and the nature of the work being operated on. As these changes of speed are required more or less frequently it is highly desirable that the means for effecting these changes be easy of manipulation and located at a place convenient to the operator when stationed before his work otherwise, rather than go to a place remote from his work to make the required change, he is likely to use a speed which does not produce maximum efficiency and which is apt to injure the tool.

As commonly constructed radial drills are provided with two independent speed-changing devices of which one known as the "speed-box," is usually located on the machine base, at the foot of the column and the other, known as the "back-gears," is located in the drill-head. This invention is particularly adaptable to an improved type of radial drill in which all of the speed-change gears have been embodied in the drill-head and in the adjustment of which the operator is not required to leave his position before his work to effect any available spindle speed.

This invention therefore has for an object to provide an improved gear-shifting mechanism by means of which the operator may, through the manipulation of a single controlling element, selectively mesh certain gears of a suitable speed-change mechanism thereby to effect any one of eight available speed changes.

Another object of the invention is to provide a gear-shifting mechanism as above described, and to combine therewith means, operative upon the shifting one gear-unit, to automatically lock the other shiftable gear-units against movement.

A still further object of this invention is to provide, in a gear-shifting mechanism having a single controlling element adapted to assume any one of eight operative positions, a single detent adapted to hold the controlling element in each of its operative positions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a vertical section of a portion of a drill-head embodying the present invention. Fig. 2 is a horizontal section substantially on the line 2—2 of Fig. 1. Fig. 3 is a vertical section substantially on the line 3—3 of Fig. 2. Fig. 4 is a vertical section on the line 4—4 of Fig. 3, certain parts being omitted for the sake of clearness. Fig. 5 is a detail section on the line 5—5 of Fig. 2 showing the detent mechanism for preventing accidental shifting of the gears, and Fig. 6 is a perspective view of a locking element later to be referred to.

Referring more particularly to the drawings the invention is disclosed as embodied in a radial drill-head 1 within which is rotatably and translatably journaled the usual drill-spindle 2 adapted to carry a drill-point or other conventional tool. Power to rotate the spindle is introduced into the drill-head by a shaft 3 journaled lengthwise of a radial-arm upon which the drill-head is slidably mounted. Intermediate the shaft 3 and the spindle 2 are arranged three speed-change devices, A, B, and C adapted to multiply a single speed in the shaft 3 into thirty-two speeds in the spindle. The speed-change devices A and B afford eight speed-changes and correspond to the speed changes usually provided by a suitable speed-box located adjacent a motor or other prime-mover remote from the drill-head. The speed-change device C affords means to quadruple the speeds delivered by the devices A and B.

Power is taken from the shaft 3 and delivered, by means of suitable bevel-gears, to a shaft 4 rotatably journaled in bearings 5 and 6 in the drill-head. Upon the shaft 4 is secured gear-units 7 and 8 providing driving-gears $7^a$, $7^b$, and $8^a$, $8^b$ respectively, adapted to be meshed with gears $9^a$, $9^b$ and $10^a$, $10^b$ provided by two independently shiftable gear-units 9 and 10 splined upon a shaft 11. The gear-units 7, 8, 9 and 10 form the first speed-change device A which multiplies a single speed in the shaft 3 into four speeds in the shaft 11.

The second speed-change device B comprises a gear-unit 12 fixed upon the shaft 11 and formed with gears $12^a$ and $12^b$ adapted to mesh respectively with gears $13^a$ and $13^b$ provided by a shiftable gear-unit 13 splined upon a shaft 14 journaled in the drill-head coaxial with the shaft 4. Thus through the gears $12^a$, $13^a$, and $12^b$, $13^b$ the four speeds available in the shaft 11 are doubled into eight speeds in the shaft 14.

The third speed-change device C or "back-gears" as they are commonly called provides four additional speed-changes which multiplies the speeds available in the shaft 14 and produces thirty-two speeds in the drill-spindle. Inasmuch as the back-gears and their shifting devices form no part of the present invention detailed illustration and description thereof is deemed unnecessary. It will suffice to say that this speed-change device comprises a gear-unit 15, splined to the shaft 14, which meshes with and drives a gear-unit 16 secured upon a shaft 17 journaled in the drill-head. From the unit 16 and shaft 17 power is selectively transmitted to a gear-unit 18 splined to the spindle-rotating sleeve within which the spindle is splined in the usual manner.

As hereinbefore stated this invention relates primarily to controlling devices for speed-change mechanisms, such as are used in radial drill-heads. A practical embodiment of the invention is therefore illustrated in connection with the speed-change devices A and B. The drill-head 1 carries, within easy reach of the operator, when stationed at his work, a speed controlling lever 19 adapted to occupy any one of eight different positions and in moving to each of these positions to effect the engagement of two of the gears in the speed-change device A. This lever likewise effects the engagement of the gears $12^a$ and $13^a$ or $12^b$ and $13^b$ of the speed-change mechanism B to complete the drive from the shaft 4 to the shaft 14. The lever 19 is preferably formed, at one end, with a ball 20 which is maintained against lateral displacement by walls 21 and 22 of a slot 23 formed in a housing 24 carried by the drill-head. The opposite end of the lever projects through a slot formed in the housing and is provided with a hand-grasp $19^x$. Intermediate its ends the levers 19 is pivoted, at 25, to a shaft 26 rotatably and translatably journaled in bearings $a$, $b$ and $c$ sustained by the drill-head. Fixed to the shaft 26, as by means of a pin 27, is a sleeve 28 provided at one end with a gear-segment 29 and at the other end with a gear-segment 30. The segment 30 is adapted, in one extreme position of the shaft to engage rack-teeth 31 formed on a gear-shifting slide 32 and in another extreme position of the shaft to engage teeth 33 provided on a similar gear-shifting slide 34. In an intermediate position of the shaft 26 the segment 29 engages rack-teeth 35 provided by a member 36 fixed to a shaft 37 vertically movable in bearings 38 and 39 in the drill-head. The member 32 is slidably mounted on a rod 40 and is provided with arms 41 and 42 adapted to engage the opposite sides of the gear-unit 10. Thus when the member 32 is moved lengthwise of the rod, by means of the segment 30, as will later be described, it will cause translation of the gear-unit 10 and engage either the gears $8^a$ and $10^a$ or $8^b$ and $10^b$. To prevent rotation of the slide 32 on the rod 40 it is preferably formed with a bifurcated arm 43 which embraces a rod 44, upon which is slidably mounted the member 34. This member 34 is likewise provided with arms 45 and 46 which embrace the gear-unit 9 and cause its translation on the shaft 11 when the member is shifted by means of the segment 30 engaging the rack-teeth 33 thereon. An arm 47, similar to the arm 43 is formed integral with the slide 34 and embraces the rod 40 to hold the slide against rotation around the rod 44. The upper end of the shaft 37 is provided with a fork 48 which embraces the gear-unit 13 intermediate the gears $13^a$ and $13^b$. Thus when the shaft 37 is moved in one direction by means of the segment 29 and the rack-teeth 35 the fork 48 shifts the gear $13^a$ into mesh with the gear $12^a$ and when the shaft is shifted in the opposite direction the fork causes engagement of the gears 13$^b$ and 12$^b$.

The shaft 26 may be rotated and translated selectively to effect any one of the eight speeds available in the speed-change devices A and as will now be described. The housing 24 is formed with two H-slots E and F connected together at their centers by a straight slot G. The H-slot E comprises parallel slots $d$ and $e$ and a cross-slot $f$ and the H-slot F comprises similar parallel slots $g$ and $h$ and a cross-slot $i$. The slots $d, e, g$ and $h$ terminate in ends $d^1, d^2, e^1, e^2, g^1, g^2$ and $h^1, h^2$ respectively, into which the lever 19 may be shifted to effect the eight speeds provided by the speed-change devices A and B. As shown in the drawings, when the lever 19 is in the slot G the segment 29 is in engagement with the rack 35 fixed to the shaft 37 which carries the gear-shifting fork 48, and the segment 30 is in its neutral position between the racks 31 and 33 and the gear-units 9 and 10 are out of engagement with the gear-units 7 and 8. Therefore movement of the lever through the slot G will cause only translation of the gear-unit 13 and will mesh either gears 12$^a$ and 13$^a$ or 12$^b$ and 13$^b$ dependent upon the direction of movement from the neutral position. In this movement of the lever the ball 20 slides idly between the walls 21 and 22 and the lever does not effect endwise movement of the shaft 26. When the lever 19 is moved transversely through the slots $f$ and $i$ the ball 20, held between the walls 21 and 22, forms a fulcrum for the lever and the shaft 26 will be moved endwise and will cause the segment 30 to engage either the rack 31 or the rack 33 dependent upon the direction of movement of the lever. The housing may be provided adjacent the ends of the slots $d$, $e, g$ and $h$, with suitable indicia to indicate the speed of rotation attained in each position of the lever 19.

Considering now that the parts are in the positions shown in Figs. 1, 2 and 4, that is with the gears in their neutral positions and the lever in the center of the slot G and supposing that the operator desires to effect a certain speed of rotation in the shaft 14; by consulting the indicia he will find the position to which the lever must be moved to give the desired speed. Let it be supposed that the desired speed is represented by II in Fig. 1, that is at the end $h^2$ of the slot $h$. The operator will first swing the lever counter-clockwise (as viewed in the direction of the arrow $s$ Fig. 1) through the slot G until it enters the cross-slot $i$. This movement will cause the segment 29 to shift the rack 35 upwardly which in turn will mesh the gear 13$^b$ with the gear 12$^b$. He will then swing the lever toward the drill-head, that is in the direction of the arrow $t$, which movement will move the shaft 26 endwise, disengaging the segment 29 from the rack 35 and engaging the segment 30 with the rack 31. A further counter-clockwise movement of the lever into the end $h^2$ of the slot $h$ will again rotate the shaft 26 and the segment 30 will shift the rack 31, and its gear-shifting arms 41 and 42, upwardly which will shift the gear 10$^b$ into engagement with the gear 8$^b$, thus completing the driving connection. Obviously all of the other seven speeds may be obtained in a similar manner, the speed obtained being determined by the position of the lever 19.

A novel locking device is also provided to positively hold the gear-shifters and the gears actuated thereby in their adjusted positions when they are disengaged from the segments 29 and 30. This device comprises a yoke 50 loosely supported by the shaft 26 and having portions 51 and 52 which engage opposite ends of the sleeve 28. By this engagement the yoke will be moved axially with the shaft and sleeve 28. This yoke is formed with arms 53, 54, 55 and 56, each provided at its free end with a single tooth 53′, 54′, 55′ and 56′ respectively. The teeth 53′ and 54′ are located at opposite sides of the segment 29 and the teeth 55′ and 56′ are likewise located at opposite sides of the segment 30. Therefore whenever the sleeve is moved lengthwise to disengage the segment 29 from the rack 35 or the segment 30 from either of the racks 31 or 33, one of the teeth 53′, 54′, 55′ or 56′ will be moved into the disengaged rack and will hold the gear-shifters against accidental movement. The yoke is provided at one side with spaced walls 57 and 58 which receive between them a square pin 59 fixed to a stationary part of the drill-head, thus the yoke is held against rotation about the shaft 26 and the teeth 53′, 54′, 55′ and 56′ are always maintained in position to mesh with the teeth of the rack-bars.

The racks 31 and 33 are provided at their opposite ends with wide teeth 31$^a$, 31$^b$ and 33$^a$ and 33$^b$ respectively which project beyond the other teeth of the racks and which, in the movement of the slides 32 and 34 are adapted to contact with the teeth 55′ or 56′ thereby to limit the movement of the gear-shifters to insure proper meshing of the gears 7$^a$, 7$^b$, 8$^a$, 8$^b$ with the gears 9$^a$, 9$^b$, 10$^a$ and 10$^b$ respectively. Upward movement of the gear-unit 13 is limited by a pin 57 carried by the shaft 37 and adapted to engage the underside of the bearing 39. The lowermost position of the gear-unit 13 is determined by the bearing-ring 58 against which the gear is adapted to rest.

Secured to the shaft 26, as by means of a pin 59, is a sector 60 provided with detent-notches 61, 62, 63 and 64 adapted to receive a spring-pressed detent 65. The notches 61, 62, 63 and 64 correspond to the four effective positions of adjustment of the lever 19 about the axis of the shaft 26 e. g. $d^1$, $d^2$, $g^1$ and $g^2$ it being understood that the positions at $e^1$, $e^2$, $h^1$ and $h^2$ are the same, as regards the rotative position of the shaft. The detent 65 therefore engages the notches in the sector 60 and prevents accidental movement of the shaft 26 and of the gear-shifter when in engagement with either the segment 29 or 30.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having this revealed this invention, we claim as new and desire to secure the following combinations and elements, or equivalents thereof, by Letters Patent of the United States:—

1. In combination with speed-change mechanism, including two independent serially arranged sets of speed-change gears comprising three fixed gear-units and three shiftable gear-units, each shiftable gear-unit having two operative positions to produce two speed-changes, a gear shifter operatively connected with each shiftable gear-unit; a rotatable and translatable shaft; a single member carried by said shaft and adapted to engage one of said gear-shifters in each three axial positions of said shaft; a lever pivoted to said shaft and fulcrumed on one side thereof; and a guide controlling the action of said lever and permitting it to be shifted lengthwise of said shaft to a mean position and to two extreme positions, and transversely of said shaft to two effective positions in said mean position and to four effective positions in each of said extreme positions; said lever, in its transverse movements, acting through said shaft and gear shifter to shift said gears thereby selectively to produce eight speed changes.

2. In combination, two serially arranged speed-change mechanism each including relatively shiftable gears; means for selectively meshing the gears of each speed-change mechanism, said means including a shaft rotatable and translatable axially to three positions; an operative connection between said shaft and a shiftable gear of one of said speed-change mechanisms in each of its extreme axial positions; an operative connection between said shaft and a shiftable gear of the other speed-change mechanism in its mean position; a single lever having a neutral position and a plurality of operative positions, said lever being pivoted to said shaft and adapted to shift it axially to its three positions of adjustment and in each position to rotate it, selectively to mesh the gears of one of said speed change mechanisms; and means controlling the movement of said lever from its neutral position to insure the actuation of said speed change mechanism in a predetermined order.

3. In combination, speed-change mechanism comprising first and second independent and serially arranged change-gear sets, including respectively two and one shiftable gear-units and complimental non-shiftable gear-units; a gear-shifting mechanism comprising a plurality of gear-shifting members; a lever adapted to be given four operative movements in two extreme positions and two operative movements in one mean position; operative connection between said lever and said gear shifting members; means actuated by said lever when it is moved through its mean position to shift into mesh the gears on said second change-gear set; means to engage said lever with another of said gear-shifting members when said lever is moved out of its mean position; and means permitting said lever to be actuated to shift the shiftable gear-unit of said first gear set without disturbing the drive effected in the second gear set thereby effecting a drive through both of said gear sets.

4. A gear-shifting mechanism comprising a lever having a neutral position; a plurality of gear-shifting members adapted to be actuated by said lever; a shaft operatively connected with said lever; means for separately effecting operative connections between said shaft and said gear-shifting members; means to permit said lever to be moved only rotatively about the axis of the shaft from its neutral position; means for effecting translation of one gear-unit during said movement; means permitting said lever to be moved in either of two directions transverse to its first movement to move said shaft bodily to effect an operative connection between said shaft and one of said gear-shifting members; and means permitting said lever then to be swung about the axis of the shaft in either of two directions selectively to shift one of said gear-shifting members in either of two directions.

5. A gear shifting device for speed change mechanisms including at least three shiftable gear-units and three nonshiftable gear-units; a shifting member connected with each of said shiftable gear-units, two of said shifting members being arranged adjacent each other and the third shifting member being arranged remote therefrom; a rack on each of said shifting members; a single shiftable controlling element provided with a first gear-segment adjacent the remote shifting member and a second gear segment between said two adjacent shifting members, said gear segments and racks being so constructed and arranged that only one of said shifting members may be engaged by said controlling element at a time; and a locking element having portions engaging the racks on the two shifting members not engaged by the controlling element for positively holding those members against movement.

6. In combination with a speed-change device including a shiftable gear and a non-shiftable gear; a gear-shifter operatively connected with said shiftable gear and provided with rack-teeth of which the end teeth are relatively wide and the intermediate teeth are relatively narrow; a gear-segment; a movable stop; means to move said gear-segment in one direction to effect its engagement with said narrow rack-teeth and simultaneously therewith to move said stop into the path of movement of said wide teeth; and means to move said gear-segment in a direction transverse to its first named movement to cause it to translate said gear-shifter, said stop being adapted to engage one of said relatively wide teeth to limit the movement of said gear-shifter.

7. A gear-shifting mechanism combining a plurality of gear-shifting elements each operatively connected with a shiftable gear; an actuating member for said elements; means to shift said member bodily to cause it to engage one of said gear-shifting elements; a positive locking device actuated by the movement of said member to engage the shifting elements not engaged by said member; means to rotate said member to cause it to actuate the gear-shifting element engaged thereby; and a yielding detent means for holding said member in all of its positions of rotation.

8. A gear-shifting mechanism combining a plurality of parallel rods; a gear-shifter slidably mounted upon each of said rods and each provided with a rack; an actuating shaft; a member secured to said shaft and provided with a gear-segment; means for shifting said shaft axially to cause said segment to engage one of said racks; a yoke loosely journaled on said shaft and movable axially with said shaft, said yoke being provided at opposite sides of said segment with locking teeth for said racks; means to rotate said segment to shift the engaged gear-shifter; and means to prevent rotary movement of said locking device.

9. In combination with two independent speed-change devices for producing at least eight speeds, each device including a shiftable gear; a gear-shifting mechanism comprising a plurality of gear-shifters each connected with one of said shiftable gears; a single actuating member for said gear-shifters; a lever for moving said member; and a housing having two H-slots and a slot connecting said H-slots through which the lever extends, for limiting the movement of said lever.

10. In combination with a gear-shifting lever provided at one end with a fulcrum; a housing providing spaced walls between which the fulcrum is slidably held, and two connected H-slots, through which said lever extends, said slots providing eight operative positions for said lever; and gear-shifting means operatively connected with said lever.

In witness whereof, we have hereunto subscribed our names.

DAVID C. KLAUSMEYER.
HOWARD E. DARBY.